United States Patent [19]

Viterbi

[11] Patent Number: 5,193,094
[45] Date of Patent: Mar. 9, 1993

[54] METHOD AND APPARATUS FOR GENERATING SUPER-ORTHOGONAL CONVOLUTIONAL CODES AND THE DECODING THEREOF

[75] Inventor: Andrew J. Viterbi, La Jolla, Calif.

[73] Assignee: Qualcomm Incorporated, San Diego, Calif.

[21] Appl. No.: 489,677

[22] Filed: Mar. 7, 1990

[51] Int. Cl.$^5$ .............................................. G06F 11/08
[52] U.S. Cl. .................................................... 371/43
[58] Field of Search ................. 371/43, 44, 45; 341/94

[56] References Cited

U.S. PATENT DOCUMENTS

| | | | |
|---|---|---|---|
| 3,697,947 | 10/1972 | Macy | 371/45 |
| 4,128,828 | 12/1978 | Samejima et al. | 371/43 |
| 4,395,768 | 7/1983 | Goethols et al. | 371/45 |
| 4,761,778 | 8/1988 | Hui | 371/45 X |

Primary Examiner—Charles E. Atkinson
Assistant Examiner—Allen M. Lo
Attorney, Agent, or Firm—Russell B. Miller

[57] ABSTRACT

An encoder and decoder for generating and decoding convolutional codes of enhanced orthogonality. In an exemplary embodiment the encoder includes a K bit length shift register for receiving an input serial stream of information bits and providing for each input bit a K bit parallel output to an orthogonal code sequence generator where one of $2^{K-1}$ symbol sequences is generated with each symbol sequence of a K−2 symbol length. The encoded symbol stream is decoded using an orthogonal function generator driven by a K−2 binary counter to generate all possible symbol sequences for comparison with each received symbol sequence. The output of the comparison is Viterbi decoded to provide the original stream of information bits. Corresponding methods of encoding the information bits and decoding of the symbol sequences are included.

20 Claims, 3 Drawing Sheets

5,193,094

METHOD AND APPARATUS FOR GENERATING SUPER-ORTHOGONAL CONVOLUTIONAL CODES AND THE DECODING THEREOF

BACKGROUND OF THE INVENTION

I. Field of the Invention

The present invention relates to data coding and decoding. More particularly, the present invention relates to a novel and improved method and apparatus for encoding data in orthogonal convolutional code form and the decoding of corresponding encoded data.

II. Description of the Related Art

The coding of digital message data is known to increase the reliability in communication of the data. Errors occuring in transmission of the data are much more likely to be detected should the data be coded. Coding of the data can provide an indication of the occurrence of errors in transmission and the correction of occuring errors.

Various coding techniques are used for preparing digital data for transmission. Examples of coding schemes include block codes and convolutional codes. In convolutional codes, parity-check information is distributed over a span of message symbols, called the constraint span of the code. Accordingly, long streams of message bits can be encoded continuously with out having to group the bits into blocks as is for block codes. Convolutional codes thus provide a unique scheme by which message bits may be simply and rapidly coded.

Implementations of convolutional coders and decoders are well known in the art. A basic implementation of a convolutional encoder is exemplified and described with reference to FIG. 1. Various implementations of decoders are well known and need not be discussed herein.

Orthogonal convolutional encoders are well known methods of generating codes with a large bandwidth expansion. The constraint length of the orthogonal code is, however, limited to the logarithm to the base 2 of the bandwidth expansion. This limits the power of the code in detecting and correcting errors.

It is therefore, an object of the present invention to provide a novel and improved convolutional encoder which is capable of providing a longer code constraint length for a given bandwidth expansion than conventional orthogonal convolutional encoders.

It is another object of the present invention to provide a novel and improved method of generating convolutional codes of large bandwidth expansion and long code constraint length.

It is yet another object of the present invention to provide a novel and improved method and apparatus for decoding super-orthogonal codes generated in accordance to the present invention.

SUMMARY OF THE INVENTION

The present invention is a novel and improved apparatus for convolutional encoding information bits. The apparatus comprises data converter means and orthogonal sequence generator means. The data converter means is for receiving a serial input of information bits and providing for each sequential input information bit a corresponding parallel output of the K most recently received information bits, a most recently received information bit through a least recently received information bit respectively identified as first through $K^{th}$ information bits in said data conversion means output. The orthogonal sequence generator means is for receiving each output of K information bits, for performing a logical "exclusive-or" operation on said first and $K^{th}$ information bits, for generating for each input of said K information bits a plurality of predetermined sequences of $K-2$ binary count bits with each sequence of $K-2$ binary count bits provided in parallel, wherein each bit position in each sequence of $K-2$ binary count bits corresponds to a second through $K-1$ information bits, for performing a logical "and" operation on each respective one of said second through $K-1$ information bits with respect to each corresponding binary count bit in each sequence of binary count bits, for performing a parity check on a result of each set of logical "and" operations and a result of said logical "exclusive-or" operation, for providing an output symbol corresponding to a result of each parity check and with a corresponding sequence of $2^{K-2}$ symbols of a possible $2^{K-1}$ symbol sequences representative of each K information bits.

The present invention further discloses a novel and improved apparatus for decoding super-orthogonal codes generated in accordance with the invention. The present invention further discloses novel and improved methods of encoding information bits with super-orthogonal codes and the decoding thereof.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
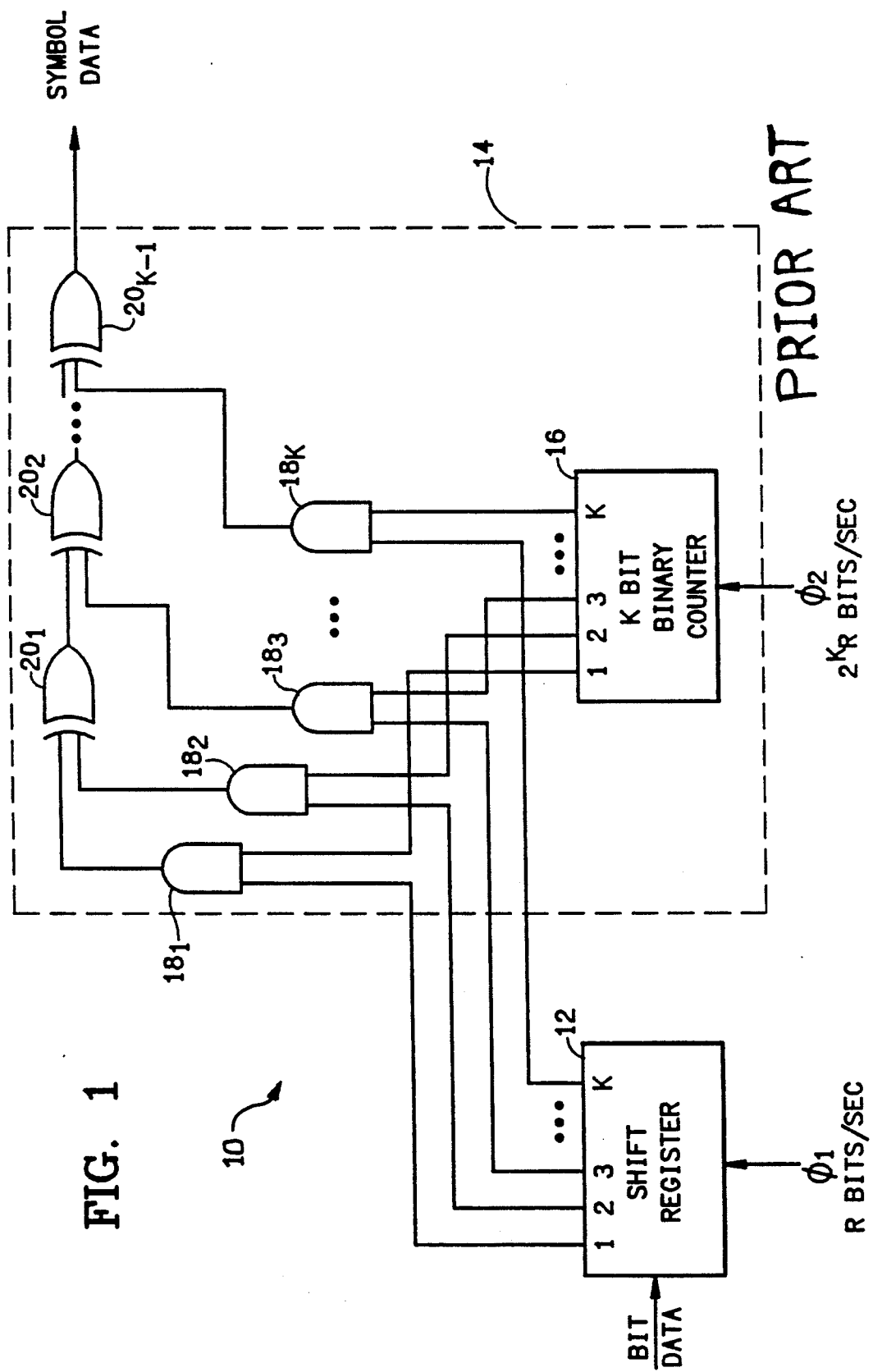
FIG. 1 is a block diagram illustrating a conventional convolutional encoder for generating orthogonal codes.

Referring now to the drawings, FIG. 1 illustrates in block diagram form an exemplary implementation of a well known orthogonal encoder based upon the Hadamard-Walsh functions. A further description of an encoder employing this type of function may be found in the article entitled "A Serial Orthogonal Decoder" by R. R. Green, *JPL Space Programs Summary*, Vol. 37-39-IV, pp. 247-253, Jet Propulsion Laboratory, Pasadena, Calif., 1966.

In FIG. 1, orthogonal encoder 10 is comprised of a serial-to-parallel data bit conversion means, i.e. shift register 12, and an orthogonal function generation means, i.e. orthogonal sequence generator 14. Generator 14 is comprised of K bit binary counter 16, AND gates $18_1$–$18_K$ and EXCLUSIVE OR gates $20_1$–$20_{K-1}$.

Shift register 12 is a K bit length register which receives at a data input a serial stream of information or message bits. Register 12 has a clock input which receives a clock signal $\phi_1$ which is at a clock rate of R bits/sec. Input information bits to be transmitted are shifted one at a time into register 12. At each clocking of the register, one information bit is input to the first register stage (left-most stage as illustrated) and the already present bits are shifted into the next register stage (a right shift as illustrated). The last bit present in the register (the bit in the right-most stage) is dropped from the register. Each register stage during each clock cycle provides an output of the stored bit to generator 14.

The output of each stage of register 12 is respectively coupled as one input to a respective one of AND gates $18_1$-$18_K$ of generator 14. The other input of each AND gate $18_1$-$18_K$ is coupled to a respective output of K bit binary counter 16. Counter 16 has a clock input for receiving the clock signal $\phi_2$ which is at a rate of $2^K$ times the bit rate, i.e. $2^K R$ bit/sec. Counter 16 thus produces during each bit period $2^K$ different binary output values.

For each clocking of counter 16 the bit value output from each stage of register 12 is and'ed with the output values from a corresponding output of counter 16 in a respective AND gate $18_1$-$18_K$. The outputs of AND gates $18_1$-$18_K$ are respectively provided as one input to a respective one of EXCLUSIVE OR gates $20_1$-$20_{K-1}$. EXCLUSIVE OR gates $20_1$-$20_{K-1}$ are configured as a parity tree with the inputs to the first EXCLUSIVE OR gate $20_1$ provided as the outputs from AND gates $18_1$ and $18_2$. The output from EXCLUSIVE OR gate $20_1$ is provided as an input to EXCLUSIVE OR gate $20_2$ with the other input from the output of AND gate $18_3$. Similarly, the output from each EXCLUSIVE OR gate is provided as an input to a next EXCLUSIVE OR gate in the parity tree along with the output from a next AND gate. The generated symbol output from generator 14 is provided from the last EXCLUSIVE OR gate, EXCLUSIVE OR gate $20_{K-1}$, which receives its input from the output of the next to last EXCLUSIVE OR gate and AND gate $18_K$. Because of the associative and commutative properties of the EXCLUSIVE OR function, the parity tree may be reordered without affecting the results.

For each bit period, the bit values output from register 12 control the operation of the generator 14 by selecting which of the possible $2^K$ sequences to produce. Each sequence produced is $2^K$ symbols in length. With register 12 clocked at the bit rate R and counter 16 clocked at $2^K$ times the bit rate R results is the generation of $2^K$ symbols/information bit. Accordingly the resulting convolutional code rate is $2^{-K}$ bits/symbol.

For the reasons discussed above, conventional orthogonal convolutional encoders are limited in their code constraint length to the logarithm to the base 2 of the bandwidth expansion. It is desirable to have convolutional codes with longer code constraint length as this allows better error detection and correction performance. The present invention provides by exemplary illustration a method and means by which such codes, referred to herein as super-orthogonal codes, may be generated and decoded.

Super-orthogonal convolutional codes can be defined as a variant of orthogonal codes which provide better performance for a given channel bandwidth expansion. Their most likely application is to spread-spectrum or code-division multiple access (SSMA or CDMA) where many users share a common spectral bandwidth W which is many times the data rate to be transmitted by each user. However, the ratio of the aggregate data rate of all users to bandwidth, W, can be much greater with this technique than with conventional TDMA or FDMA.

Figure 2:
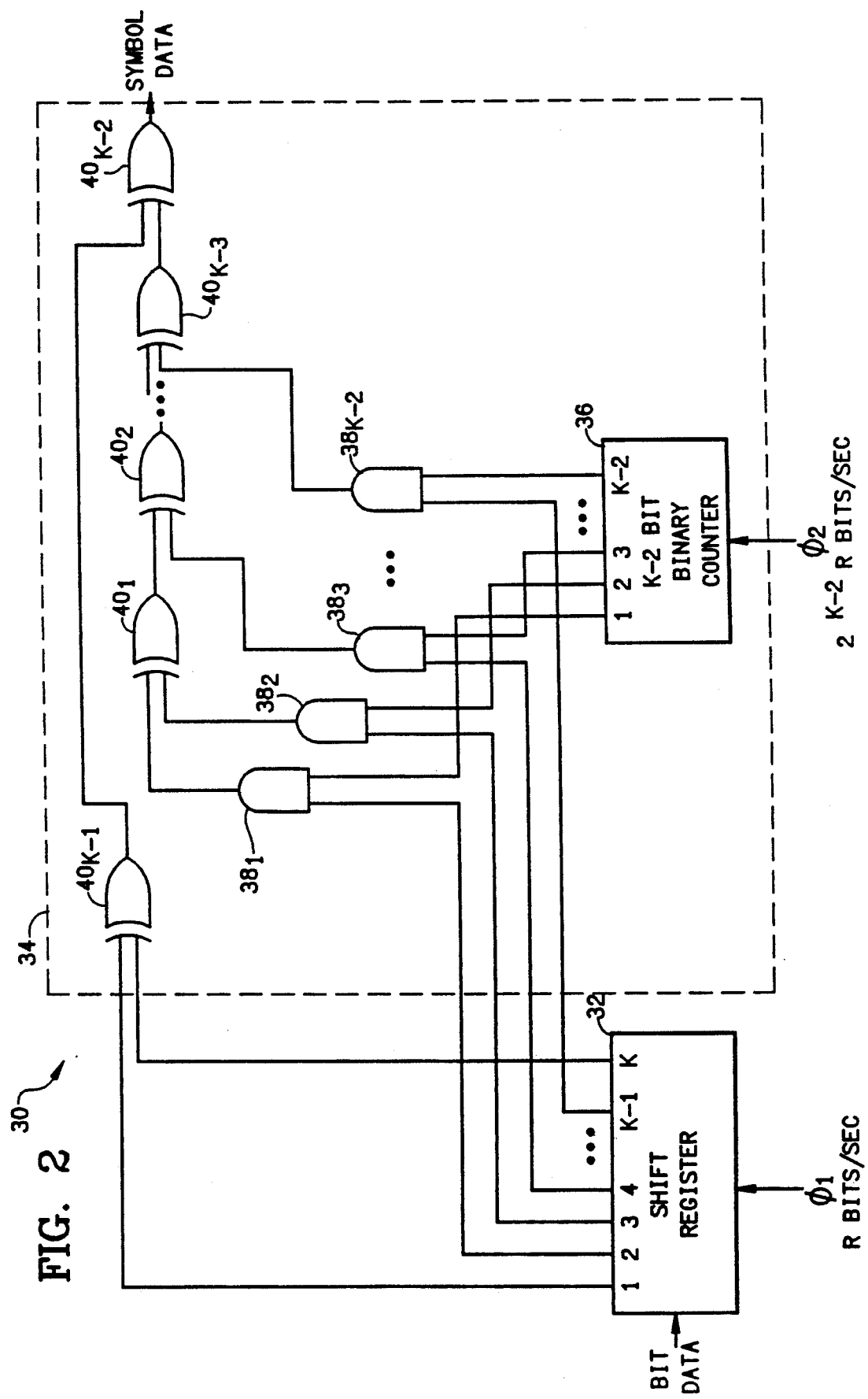
FIG. 2 is a block diagram illustrating, in an exemplary embodiment, a convolutional encoder for generating super-orthogonal codes in accordance with the present invention.

FIG. 2 illustrates an exemplary embodiment of a super-orthogonal encoder of the present invention. In the embodiment illustrated in FIG. 2, super-orthogonal encoder 30 is of a constraint length K and incorporates an orthogonal convolutional encoder of constraint length $K-2$. The orthogonal convolutional encoder is augmented by a first stage and a last stage whose contents are added modulo-2 (exclusive or'ed) to the $2^{K-2}$ symbols generated by the orthogonal convolutional encoder during each bit period. It should be noted, however, that for a given bandwidth expansion that the code constraint length has been increased by two.

In FIG. 2, encoder 30 is comprised of a serial-to-parallel data bit conversion means, i.e. shift register 32, and a super-orthogonal function generation means, i.e. super-orthogonal sequence generator 34. Generator 34 is comprised of $K-2$ bit binary counter 36, AND gates $38_1$-$38_{K-2}$, and EXCLUSIVE OR gates $40_1$-$40_{K-1}$.

Shift register 32 is a K bit length register which receives at a data input a serial stream of information or message bits. Register 32 has a clock input which receives a clock signal $\phi_1$ which is at a clock rate of R bits/sec. Input information bits to be transmitted are shifted one at a time into register 32. At each clocking of the register, one information bit is input to the first register stage (left-most stage as illustrated) and the already present bits are shifted into the next register stage (a right shift as illustrated). The last bit present in the register (the bit in the right-most stage) is dropped from the register. Each register stage during each clock cycle provides an output of the stored bit to generator 34.

The output of the first and last stages of register 32 (stage outputs labeled 1 and K) are provided as inputs to EXCLUSIVE OR gate $40_{K-1}$. The output of the second stage through the $K-1$ stage of register 32 (stage outputs labeled 2 through $K-1$) are each respectively coupled as one input to a respective one of AND gates $38_1$-$38_{K-2}$ of generator 34. The other input of each AND gate $38_1$-$38_{K-2}$ is coupled to a respective output of $K-2$ bit binary counter 36. Counter 36 has a clock input for receiving the clock signal $\phi_2$ which is at a rate of $2^{K-2}$ times the bit rate, i.e. $2^{K-2}R$ bit/sec. Counter 36 thus produces during each bit period $K-2$ different output values.

During each bit period the bit value output from the first and last stage of register 32 are exclusive or'ed by EXCLUSIVE OR gate $40_{K-1}$. The bit values output from the second through the next to last stage of register 32 (stages 2 through $K-1$) are each and'ed with the output values from a corresponding output of counter 36 in a respective AND gate $38_1$-$38_{K-2}$. The outputs of AND gates $38_1$ and $38_2$ are provided as the inputs to EXCLUSIVE OR gate $40_1$ while the outputs of AND gates $38_3$-$38_{K-2}$ are respectively provided as one input to a respective one of EXCLUSIVE OR gates $40_2$-$40_{K-3}$. EXCLUSIVE OR gates $40_1$-$40_{K-1}$ are configured as a parity tree. The output from EXCLUSIVE OR gate $40_1$ is provided as an input to EXCLUSIVE OR gate $40_2$ with the other input from the output of AND gate $38_3$. Similarly, the output from each EXCLUSIVE OR gate is provided as an input to a next EXCLUSIVE OR gate in the parity tree along with the output from a next AND gate. The generated symbol output from code generator 34 is provided from the last EXCLUSIVE OR gate, EXCLUSIVE OR gate $40_{K-2}$, which receives its input from the output of the next to last EXCLUSIVE OR gate $40_{K-2}$ and EXCLUSIVE OR gate $40_{K-1}$.

There are now $2^{K-1}$ possible code sequences for each new input bit, each of length $2^{K-2}$. These consist of the $2^{K-2}$ sequences as for the orthogonal case, augmented by $2^{K-2}$ other sequences which are the complements of the former (where "0" is replaced by "1" and vice versa).

The binary code sequences may be transmitted by phase modulation of a carrier. The code symbols are fed to a biphase (BPSK) modulator which advances phase $(+\pi/2)$ in response to a "0" input and retards phase $(-\pi/2)$ in response to a "1".

A second implementation of the super-orthogonal code would divide each bit transmission interval into $2^{K-2}$ equal sub-intervals. The $2^{K-2}$ central bits of the encoder shift register determine in which one of the $2^{K-2}$ sub-intervals to transmit a pulse. This is known as orthogonal pulse position modulation. The pulse has either a positive or a negative polarity as determined by the EXCLUSIVE-OR of the first and last bits of the shift register. If the EXCLUSIVE-OR result is a logic "one" then a positive pulse is transmitted; otherwise, a negative pulse is transmitted.

The present contribution consists of enhancing orthogonal convolutional coders by increasing the constraint length for a given bandwidth expansion relative to orthogonal convolutional codes so as to perform better (as shown below) at virtually no increase in complexity. Furthermore, the technique allows codes of arbitrarily large bandwidth expansion with known good properties to be easily determined. It should be understood that the encoder illustrated herein is but an exemplary embodiment based upon the Hadamard-Walsh function. It is envisioned that implementations may be constructed using other functions of orthogonality using the teachings of the present invention.

Figure 3:
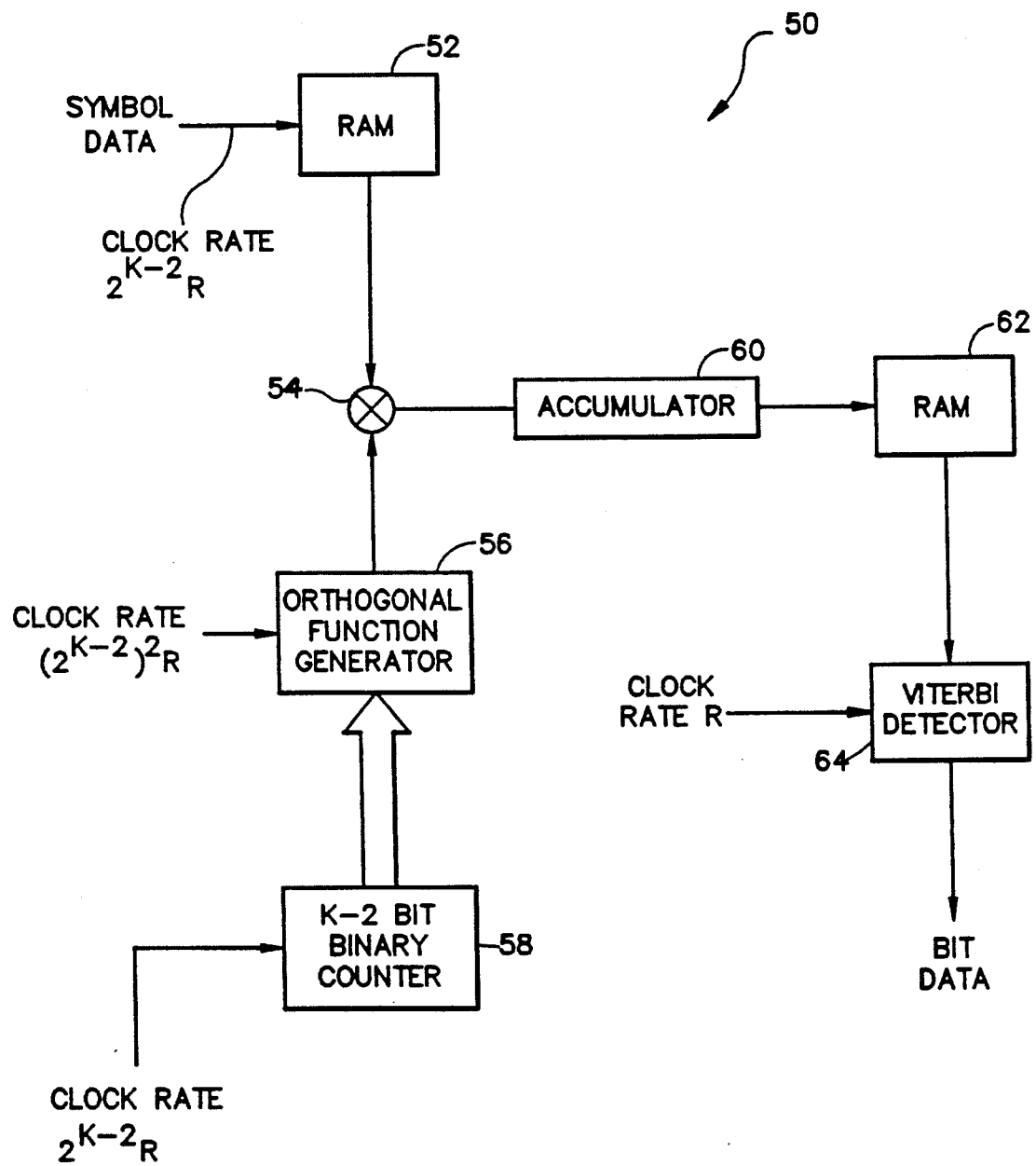
FIG. 3 is a block diagram illustrating, in an exemplary embodiment, a decoder for decoding super-orthogonal codes in accordance with the present invention.

An exemplary embodiment of a decoder for the super-orthogonal convolutional code is shown in the block diagram of FIG. 3. The symbol data input to decoder 50 for each bit time consists of a sequence of $2^{K-2}$ symbols.

First, the decoder must compute the likelihood of receiving each of the $2^{K-1}$ possible encoder symbol sequence outputs. This can be done by correlating the received symbols with each of the possible transmitted sequences. The results are called the branch metrics of the decoder. It is noted that it is also possible to compute the branch metrics by use of an inverse Fast Hadamard Transform operation, resulting in fewer computational steps for the same result. This type of operation is really just a rearrangement of the order of computation with reuse of intermediate results. In the second encoding method, the received symbols are used directly as the decoder branch metrics.

As illustrated in FIG. 3, decoder 50 is comprised of random access memory (RAM) 52, digital multiplier 54, orthogonal function generator 56, K−2 bit binary counter 58, accumulator 60, RAM 62, and Viterbi decoder 64. During each bit time, the input stream of $2^{K-2}$ symbols are input to a temporary storage medium such as random access memory (RAM) 52. RAM 52 provides an output of symbol sequences as an input to multiplier 54.

The other input to multiplier 54 is provided by generator 56. Generator 56 is identical to generator 16 as was discussed with reference to FIG. 1, except that the internal K bit binary counter (not shown) is actually a K−2 bit binary counter, counter 58. Generator 56 has as its inputs the counter outputs of counter 58. Counter 58 is driven by the clock signal $\phi_2$ which is at the rate of $2^{K-2}$ R bits/sec. The counter within function generator 56 is driven at a clock rate $\phi_2$ equal to $(2^{K-2})^2$ R bits/second. Each output bit count value from counter 58 is used to control generator 56 so as to generate one of $2^{K-2}$ possible sequences that may match the input sequences of symbol data. Therefore, during each bit time $2^{K-2}$ symbol sequences are generated. The output from generator 56 is provided as the second input to multiplier 56.

Multiplier 56 multiplies the input data and provides a corresponding output to accumulator 60. The accumulated data is then output to a temporary storage medium such as RAM 62. The data output from RAM 62 are the branch metrics for the symbol data which is provided to Viterbi decoder 64, whose structure and function are well known in the art.

The contribution to the invention consists of providing a means for decoding the super-orthogonal code using the maximum likelihood Viterbi decoding algorithm.

Performance is measured in terms of the bit energy-to-noise density $(E_b/N_o)$ required to achieve a given bit error rate. For example, for BER$=10^{-5}$, a super-orthogonal code of constraint length K$=12$ requires $E_b/N_o \leq 2.2$ dB.

Another measure is the coding gain relative to uncoded operation, measured by the reduction in required $E_b/N_o$. $E_b/N_o$ is the ratio of the energy per bit to the noise power spectral density and is the standard figure of merit by which modulation and error correction coding systems are compared. At BER$=10^{-5}$, the uncoded data required an $E_b/N_o=9.6$ dB, so the coding gain at this point for the K$=12$ code is at least 7.4 dB. This grows to over 8 dB at BER$=10^{-8}$. The coding gain increases with reduced BER and achieves a limit for asymptotically low BER called the asymptotic coding gain (ACG). The ACG for orthogonal codes is much worse for small K (over 2 dB at K$=3$) and about 0.5 dB worse at K$=12$ than for super-orthogonal codes. It can be shown that super-orthogonal codes achieve an ACG which is never worse than 0.6 dB from the upper limit on ACG for the best convolutional code of given K.

In a spread spectrum multiple access (SSMA) communication system, the importance of minimizing $E_b/N_o$ for a given performance level follows from the fact that the number of users M supported at a common data rate R over a common bandwidth W is given approximately by the following equation:

$$M = \frac{W/R}{\beta E_b/N_o} \quad (1)$$

where $\beta < 1$ is a factor which depends on relative geometry, antenna pattern and activity factor. Thus the smaller the required $E_b/N_o$ the higher the number of users supported and hence the higher the communication efficiency, measured in aggregate bit rate per spectral bandwidth for all users combined.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. An apparatus for convolutional encoding of information bits comprising:
    data converter means for receiving a serial input of information bits and for providing, for each received input information bit, a corresponding parallel output of a group of K most recently received ones of said received information bits, a most recently received information bit through a least recently received information bit respectively identified as first through $K^{th}$ information bits; and
    orthogonal sequence generator means for receiving each group of K information bits, for performing a logical "exclusive-or" operation on said first and $K^{th}$ information bits of each received group of K information bits, for generating for each each received group of K information bits a plurality of predetermined sequences of $K-2$ binary count bits, for performing a logical "and" operation on each one of a second through a $K-1$ information bit of each received group of K information bits with respect to a corresponding binary count bit in each sequence of binary count bits, for performing a parity check on a result of each set of logical "and" operations and a result of said logical "exclusive-or" operation, and for providing a resultant output sequence of $2^{K-2}$ symbols.

2. The apparatus of claim 1 wherein said data converter means comprises a shift register having a data input, a clock input and K register stages each with a corresponding stage output.

3. The apparatus of claim 1 wherein said orthogonal sequence generator means comprises:
    a $K-2$ bit binary counter having a clock input and $K-2$ outputs;
    a plurality of AND gates each having a pair of inputs and an output, one of each AND gate inputs for receiving a respective one of said second through $K-1$ information bits and the other one of each AND gate inputs coupled to a respective one of said counter outputs;
    a plurality of EXCLUSIVE OR gates each having a pair of inputs and an output, a first EXCLUSIVE OR gate of said plurality of EXCLUSIVE OR gates having a pair of inputs for respectively receiving said first and $K^{th}$ information bits, a last EXCLUSIVE OR gate of said plurality of EXCLUSIVE OR gates having one input coupled to an output of said first EXCLUSIVE OR gate, a cascaded sequence of a second EXCLUSIVE OR gate through a next-to-last EXCLUSIVE OR gate of said plurality of EXCLUSIVE OR gates with said second EXCLUSIVE OR gate having a pair of inputs respectively coupled to an output of a first and a second AND gates of said plurality of AND gates, a third EXCLUSIVE OR gate through said next-to-last EXCLUSIVE OR gate of said plurality of EXCLUSIVE OR gates each having one input respectively coupled to an output of a third AND gate through a last AND gate of said plurality of AND gates, and with another input of each of said third EXCLUSIVE OR gate through said next-to-last EXCLUSIVE OR gate respectively coupled to an output of a preceding EXCLUSIVE OR gate in said cascaded sequence of said second EXCLUSIVE OR gate through said next-to-last EXCLUSIVE OR gate with an output of said next-to-last EXCLUSIVE OR gate coupled to another input of said last EXCLUSIVE OR gate.

4. The apparatus of claim 2 wherein said orthogonal sequence generator means comprises:
    a $K-2$ bit binary counter having a clock input and $K-2$ outputs;
    a plurality of AND gates each having a pair of inputs and an output, one input of a first through a last AND gate of said plurality of said AND gates respectively coupled to a second through a $K-1$ output of said shift register and another input of said second through said last AND gate respectively coupled to a first through a last output of said $K-2$ counter outputs;
    a plurality of EXCLUSIVE OR gates, each having a pair of inputs and an output, a first EXCLUSIVE OR gate of said plurality of EXCLUSIVE OR gates having a pair of inputs coupled to a first and a $K^{th}$ stage output of said shift register, a last EXCLUSIVE OR gate of said plurality of EXCLUSIVE OR gates having one input coupled to an output of said first EXCLUSIVE OR gate, a cascaded sequence of a second EXCLUSIVE OR gate through a next-to-last EXCLUSIVE OR gate of said plurality of EXCLUSIVE OR gates with said second EXCLUSIVE OR gate having a pair of inputs respectively coupled to an output of said first AND gate and a second AND gate of said plurality of AND gates, a third EXCLUSIVE OR gate through said next-to-last EXCLUSIVE OR gate of said plurality of EXCLUSIVE OR gates each having one input respectively coupled to an output of a third AND gate through said last AND gate of said plurality of AND gates, and with another input of each of said third EXCLUSIVE OR gate through said next-to-last EXCLUSIVE OR gate respectively coupled to an output of a preceding EXCLUSIVE OR gate in said cascaded sequence of said second EXCLUSIVE OR gate through said next-to-last EXCLUSIVE OR gate with an output of said next-to-last EXCLUSIVE OR gate coupled to another input of said last EXCLUSIVE OR gate.

5. A method for convolutional encoding information bits comprising the steps of:
    converting a serial input of information bits into a corresponding parallel output of the K most recently received information bits of said serial input of information bits wherein a most recently received information bit through a least recently received information bit are respectively identified as first through $K^{th}$ information bits;
    performing a logical "exclusive-or" operation on said first and $K^{th}$ information bits;
    generating, for each input of an information bit of said serial input of information bits, a plurality of predetermined sequences of $K-2$ binary count bits wherein each bit position in each sequence of $K-2$ binary count bits corresponds to a second through $K-1$ information bits;
    performing a logical "and" operation on each respective one of said second through $K-1$ information bits with respect to each corresponding binary count bit in each sequence of binary count bits;

performing a parity check on a result of each logical "and" operations and a result of said logical "exclusive-or" operation; and providing an output sequence of $2^{K-2}$ symbols.

6. The method of claim 5 wherein said step of performing a parity check comprises the steps of:

performing a first parity check logical "exclusive-or" operation on each result of a first and a second one of said logical "and" operation; and performing a sequence of a second through a last parity check logical "exclusive-or" operation each upon each result of a preceding one of said first through a next-to-last parity check logical "exclusive-or" operation with respect to each of a third through a last one of said logical "and" operations.

7. A data encoder comprising:

a register having an input for receiving an input sequence of data bits, and having a first through a K output at which is provided a respective one of the last K received bits of said input sequence of data bits;

an input EXCLUSIVE OR gate having a pair of inputs respectively coupled to said first and K outputs of said register, and an output;

an orthogonal function sequence generator having K−2 inputs each coupled to a respective one of a second through a K−1 output of said register, and having an output; and an output EXCLUSIVE OR gate having a pair of inputs respectively coupled to said first EXCLUSIVE OR gate output and said generator output, and an output.

8. The data encoder of claim 7 wherein said register comprises a shift register having a serial data input, a clock input for receiving a clock signal of a data bit rate of R, and K register stages each with a corresponding register stage output, a first and a K register stage output coupled to said input EXCLUSIVE OR gate.

9. The data encoder of claim 7 wherein said orthogonal function sequence generator comprises:

a K−2 bit binary counter having a clock input for receiving a clock signal of a rate of $2^{K-2}R$, where R is a data bit rate, and having K−2 counter outputs;

a plurality of AND gates each having a pair of inputs and an output, a first through a K−2 AND gate of said plurality of AND gates each having one input respectively coupled to a second through a K−1 output of said register, and said first through said K−2 AND gate each having another input respectively coupled to a first through a K−2 output of said register; and a plurality of generator EXCLUSIVE OR gates arranged in a cascaded sequence, each having a pair of inputs and an output, a first generator EXCLUSIVE OR gate inputs respectively coupled to an output of said first and second AND gate outputs, a second through a K−2 generator EXCLUSIVE OR gates each having one input coupled to a respective output of a third through said K−2 generator EXCLUSIVE OR gates with said third through said K−2 generator EXCLUSIVE OR gates other input coupled to a preceding generator EXCLUSIVE OR gate in said cascaded sequence, said K−2 generator EXCLUSIVE OR gate output coupled as an input to said output EXCLUSIVE OR gate.

10. The data encoder of claim 8 wherein said orthogonal function sequence generator comprises:

a K−2 bit binary counter having a clock input for receiving a clock signal of a rate of $2^{(K-2)}R$, and having K−2 counter outputs;

a plurality of K−2 AND gates each having a pair of inputs and an output, a first through a K−2 AND gate of said plurality of AND gates each having one input respectively coupled to a second through a K−1 output of said shift register, and said first through said K−2 AND gate each having another input respectively coupled to a first through a K−2 output of said register; and a plurality of generator EXCLUSIVE OR gates arranged in a cascaded sequence, each having a pair of inputs and an output, a first generator EXCLUSIVE OR gate inputs respectively coupled to an output of said first and second AND gate outputs, a second through a K−2 generator EXCLUSIVE OR gates each having one input coupled to a respective output of a third through said K−2 generator EXCLUSIVE OR gates with said third through said K−2 generator EXCLUSIVE OR gates other input coupled to a preceding generator EXCLUSIVE OR gate in said cascaded sequence, said K−2 generator EXCLUSIVE OR gate output coupled as an input to said output EXCLUSIVE OR gate.

11. A decoder for decoding orthogonal convolutional coded data comprising:

orthogonal function generator means for generating and providing an output of a plurality of predetermined orthogonal function sequences;

combining means for, receiving and combining an input of encoded symbol data with said plurality of orthogonal function sequences, and providing a corresponding output;

accumulator means for, receiving and accumulating said combining means output, and providing a corresponding output; and Viterbi decoder means for receiving said accumulator means output as branch metric data and computing from said branch metric data corresponding bit data.

12. The decoder of claim 11 further comprising input means for receiving and temporarily storing said input of encoded symbol data, and for providing an output thereof to said combining means.

13. The decoder of claim 11 further comprising intermediate means for receiving and temporarily storing said accumulator means output, and for providing an output thereof to said Viterbi decoder means.

14. The decoder of claim 12 further comprising intermediate means for receiving and temporarily storing said accumulator means output, and for providing an output thereof to said Viterbi decoder means.

15. A decoder comprising:

a first memory having an input for receiving an input of encoded symbol data and an output;

a multiplier having a pair of inputs and an output, one input of said multiplier coupled to said first memory output;

a K−2 bit binary counter having a counter clock input and an output;

an orthogonal function sequence generator having a generator clock input, a data input and an output, said generator data input coupled to said counter output and said generator output coupled to another input of said multiplier;

an accumulator having an input coupled to said multiplier output, and an output;

a second memory having an input coupled to said accumulator output, and an output; and a Viterbi decoder having an input coupled to said second memory output, and and output at which bit data is provided.

16. The decoder of claim 15 wherein:

said a K−2 bit binary counter receives at said counter clock input a first clock signal of a rate of $2^{K-2}R$, where R is a bit data rate; and said orthogonal function sequence generator receives at said generator clock input a second clock signal of a rate of $(2^{K-2})2R$.

17. The decoder of claim 16:

wherein said input of encoded symbol data is provided at a rate $2^{K-2}R$; and said bit data is provided at said Viterbi decoder output at a rate R.

18. A method for decoding orthogonal convolutional coded data comprising:

receiving an input of orthogonal convolutional encoded symbol data;

generating a plurality of predetermined orthogonal function sequences;

combining said received input of symbol data with said plurality of orthogonal function sequences so a to provide a corresponding combined data;

accumulating said combined data so as to provide a corresponding accumulated data;

providing said accumulated data as branch metric data to a Viterbi decoder;

computing from said branch metric data within said Viterbi decoder corresponding bit data; and providing an output of said bit data from said Viterbi decoder.

19. The method of claim 18 further comprising the step of temporarily storing said input of encoded symbol data.

20. The method of claim 19 further comprising the step of temporarily storing said accumulated data.

* * * * *